W. H. WILSON.
Modes of Changing the Speed in Machinery.

No. 140,751.    Patented July 8, 1873.

Witnesses.
J. R. Nottingham
Edmund Masson

Inventor.
William H. Wilson
By atty A. B. Stoughton

UNITED STATES PATENT OFFICE.

WILLIAM H. WILSON, OF EASTON, MARYLAND.

IMPROVEMENT IN THE MODES OF CHANGING THE SPEED IN MACHINERY.

Specification forming part of Letters Patent No. 140,751, dated July 8, 1873; application filed June 24, 1873.

*To all whom it may concern:*

Be it known that I, WILLIAM H. WILSON, of Easton, in the county of Talbot and State of Maryland, have invented certain new and useful Improvements in an arrangement for Changing the Speed of Machinery; and I do hereby declare the following to be a full, clear, and exact description of the same, reference being had to the accompanying drawings, making a part of this specification, in which—

Figure 1:
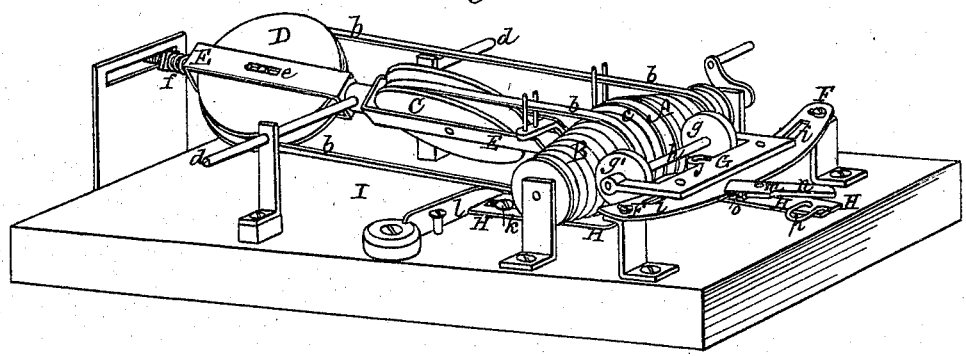
Figure 2:
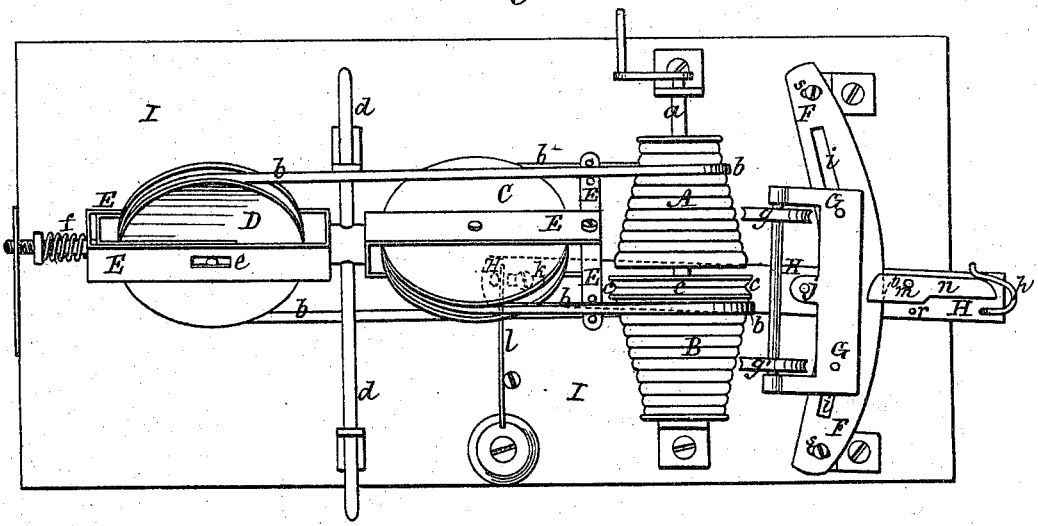

Figure 1 represents a perspective view of the apparatus entire. Fig. 2 represents a top plan of the same.

My invention relates to a speed-regulator, in which two cone-pulleys are arranged with their bases adjacent or opposite each other upon one and the same shaft; one cone—viz., the driving one—being fast on said shaft, and the other—viz., the driven one—being loose thereon, with a shifting-belt or movable friction-gear to transfer to and change the speed of the driven cone at pleasure.

To enable others skilled in the art to make and use my invention, I will proceed to describe the same with reference to the drawings.

Upon a shaft, $a$, that is driven by any first-moving power are two cones, A B, of which the one, A, is fast on and is driven by said shaft $a$; and the other, B, is loose upon said shaft, and is driven at such regulated speed as may be desired, and as will be explained, regardless of the change of speed of the other cone, A. Two inclined pulleys, C D, are arranged to hold and carry an endless belt or band, $b$, that passes around them and around both of the cone-pulleys A B, so as to transfer the power from the driving-cone A to the driven one, B; and, upon this driven cone or pulley B is a groove, $c$, for the belt or band that transfers the power to the machinery which is to be driven, and which may be at any desirable or suitable point, above, below, or on the same floor with this speed-regulating mechanism. A shipper-rod, $d$, is connected with the pulleys C D, or with the frame E that carries them, by which the belt $b$ can be shifted or moved upon the cones A B to change the speed of the latter one, B.

It will be perceived that the belt or band $b$ will always remain taut, for, as it runs up onto the greater diameter of one cone, it correspondingly runs down onto the lesser diameter of the other cone, and so changes and regulates the speed of the cone B, while the shaft $a$ and the cone A may run at uniform speed.

The pulley D is arranged, by a slot at $e$ and a spring at $f$, so that it will yield a little should the belt be overstrained in crossing the ridges of the cone-pulleys as it is shifted thereon. This mode of transferring the power and changing the speed of the loose pulley by an endless belt I prefer; but it may be done by friction-gears, as follows, or friction-wheels, coupled and extending from cone-pulley to cone-pulley, as hereinafter described: On a slotted supporting-piece, F, there is arranged, so that it may freely move thereon, a carriage, G, in which is placed two friction-wheels, $g$ $g'$, both being fast on one and the same shaft, $h$, so as to turn together and with the shaft. The carriage G, though moving on and guided by the slots $i$ $i$ in the supporting-piece F, is pivoted, at $j$, to an arm, H, which is held to the bed-piece I by a set-screw, $k$, passing through a slot in the under and lower end of said arm; and a spring, $l$, bears against a stud on said arm to cause it, when not otherwise controlled, to draw the friction-wheels $g$ $g'$, respectively, against the cones A and B. On the extreme upper and outer end of the arm H there is pivoted, as at $m$, a lever, $n$, having a cam-shoulder, $o$, upon it, which takes against the supporting-piece F, and, compressing the spring $l$, it draws, as seen in Fig. 2, the friction-wheels $g$ $g'$ away from the cones; and in this position the wheels $g$ $g'$ may be moved from one position to another upon their respective cones, so as to change the speed of the driven cone B at pleasure.

When the wheels $g$ $g'$ are drawn away from their coacting cones the lever $n$ can be locked in that position by the catch $p$; but, when this catch $p$ is removed, then the reaction of the spring $l$ brings said wheels up against their respective cones, so as to transfer the power from the driving to the driven cone at such regulated speed as may be desired, or is due to the diameter of the cones at the points of contact therewith. $r$ is a stop to prevent the lever $n$ from swinging too far.

The wheels $g\ g'$ may be grooved so as to run against ridges formed on the cones, and give them more frictional bearing-surface thereon.

The guide or supporting piece F may be made adjustable at $s\ s$, so as to allow the wheels compensation for wear.

Having thus fully described my invention, what I claim is—

In combination with the two cones A B on one and the same shaft, $a$, the cone A being fast and the cone B being loose thereon, the endless belt $b$ or its substitute, the friction-wheels $g\ g'$, for transmitting power from the driving to the driven cone, at such regulated speed as may be required.

WM. H. WILSON.

Witnesses:
A. B. STOUGHTON,
EDMUND MASSON.